No. 729,211. PATENTED MAY 26, 1903.
C. H. NORWOOD.
CIRCUIT BREAKER.
APPLICATION FILED NOV. 4, 1899.
NO MODEL.
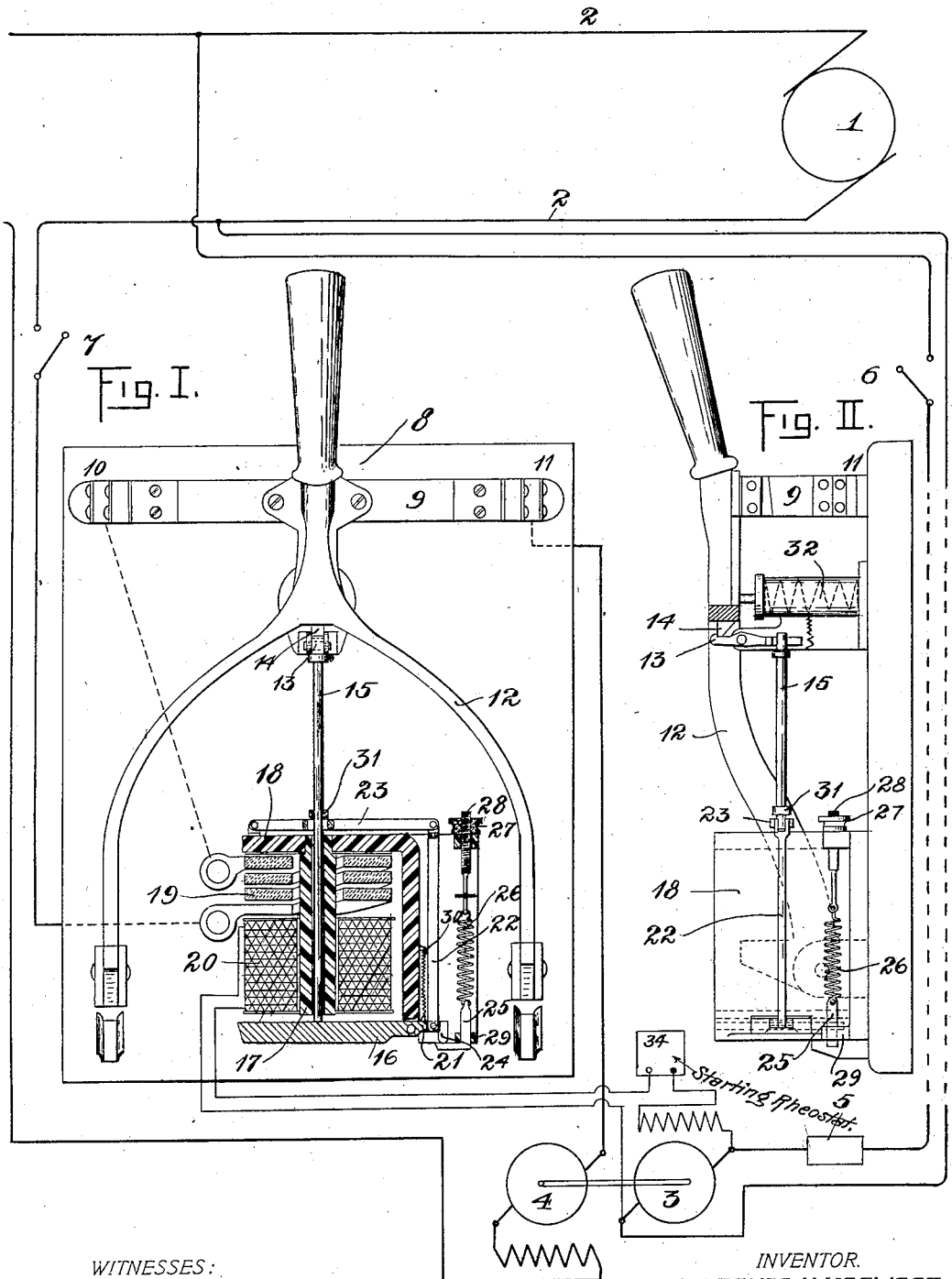
WITNESSES:
INVENTOR.
CLARENCE H. NORWOOD
BY
ATTORNEYS.

No. 729,211. Patented May 26, 1903.

UNITED STATES PATENT OFFICE.

CLARENCE H. NORWOOD, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

CIRCUIT-BREAKER.

SPECIFICATION forming part of Letters Patent No. 729,211, dated May 26, 1903.

Application filed November 4, 1899. Serial No. 735,809. (No model.)

*To all whom it may concern:*

Be it known that I, CLARENCE H. NORWOOD, a citizen of the United States, residing at Chicago, in the county of Cook and State of Illinois, have invented a certain new and useful Improvement in Circuit-Breakers, (Case No. 312,) of which the following is a full, clear, concise, and exact description, reference being had to the accompanying drawings, forming a part of this specification.

My invention relates to switches, and more particularly to that class of switches known as circuit-breakers, and has for its object the provision of means whereby circuits are protected both against overloads and underloads. Certain features of my invention, however, are useful in connection with circuit-breakers that act exclusively on overloads.

As is well known to those skilled in the art, circuit-breakers are employed to protect circuits and apparatus against overloads and short circuits, the circuit being opened automatically when the current has reached a predetermined value. It is important, however, in certain classes of work to have the circuit opened upon underloads or when the current in the circuit reaches a low or zero value. This is especially true, for example, in the operation of series-wound motor-driven boosters. If for any reason in the operation of boosters of this class the motor-circuit be opened while the booster-generator is connected to the line in which the voltage is to be raised, this generator will reverse and run as a motor and being a series-machine operating on no load will very soon reach a dangerous speed, which might even become disastrous and destroy the machine. In such instances the safety of the machine depends upon the opening of the booster-generator circuit the moment the motor portion ceases to drive it.

A further illustration of the advantage of opening the circuit upon underloads is apparent in the charging and operation of storage-battery systems, wherein a drop of voltage in the main generator may cause the storage batteries to reverse the current therethrough, thereby driving the generator as a motor. In such cases it is desirable (even though a shunt-wound generator is employed which will in the instance under consideration not change its direction of rotation when driven as a motor) to open the generator-circuit when the current becomes zero.

In accordance with the preferred embodiment of my invention I provide a circuit-breaker which combines in one instrument means for opening the circuit upon overloads or short circuits, as well as means for opening the circuit on underloads or when the current becomes zero.

Generally speaking, my invention consists, in its preferred form, of an armature pivotally mounted a short distance from one end thereof, thus forming two lever-arms, the normal position of the armature being substantially horizontal. A movement or partial rotation of the armature in one direction is occasioned by overloads and in an opposite direction by underloads or open circuit, the armature upon a sufficient movement in either direction operating a tripping device or catch to release the switch-arm, which is thereupon automatically operated by a spring to open the circuit or otherwise render the operation of the booster-generator ineffective.

To reduce the number of ampere-turns required in operating the armature, I provide a closed magnetic circuit including the armature. The closed magnetic circuit prevents scattering of lines of force to a large extent, thereby making the action of the device more positive. The action of the armature is controlled, preferably, by means of springs acting in conjunction with the magnet.

I will describe an embodiment of my invention as applied more particularly to boosters by reference to the accompanying drawings, in which—

Figure 1 is a front view, partly in section, of my improved apparatus, its circuit connections being indicated diagrammatically. Fig. 2 is a side view thereof.

Like characters of reference indicate like parts in the two views.

A main generator 1 is shown as supplying current to the mains 2 2 the voltage of the current wherein is to be raised, a booster consisting of a motor portion 3 and a generator portion 4 being employed for this purpose. The motor is in shunt of the mains 2 2, a circuit-breaker 5 and a switch 6 being included in the same bridge with the motor. The series-generator portion 4 of the booster is included in series with the mains 2 2 through a switch 7 and a switch or circuit-breaker 8. The conducting-strip 9 of the circuit-breaker is shown to be included in the main circuit at the terminals 10 11, the said conducting-strip being supplied with a carbon contact-break, as is well known in the art. The contact portion 9 is secured to a pivotally-mounted or swinging handle 12, which is held in its closed position by means of a catch 13, engaging a projection 14 of the handle 12. The pivotally-mounted catch or detent 13 is brought out of engagement with the projection 14 by means of a tripping-rod 15, made, preferably, of brass, which is operated by the movement of an armature 16.

I preferably include the armature 16 in a magnetic circuit consisting of the core 17 and the angular or L-shaped magnetic strip 18, through which portion 18 the lines of force pass from one end of the core 17 to the armature, the lines of force returning to the core through the armature. This magnetic circuit is thus practically closed. In the embodiment shown I preferably employ two coils for energizing the magnetic circuit, one of which, 19, is included in series with the circuit to be opened, the other coil, 20, being preferably included in the shunt-circuit of the field of motor 3.

I preferably pivotally mount the armature 16 between its ends upon the bent strip 18 in such manner as to provide an extending arm 21, which projects beyond the portion 18. The tripping-arm 15 preferably passes through the core 17 and rests normally upon the armature 16 out of operative engagement with the catch 13. The extending arm 21 of the armature is in engagement with an arm 22, pivotally engaging one end of another arm 23, rotatably secured at its other end to a fixed pivot. The arm 23 is preferably provided with a circular opening, through which passes the arm 15, the said arm being adapted to move vertically in said opening. I preferably provide the arm 15 with a collar 31, placed slightly above the arm 23, normally out of engagement therewith and slightly removed therefrom.

The projecting arm 21 of the armature is provided with a lug 24, which is normally in engagement with an angle-piece 25, upon which a force is exerted upwardly by a spring 26, whose tension may be suitably varied—as, for instance, by means of a nut 27 and screw 28. The upward movement of the angle-piece 25 is limited by a stationary support 29, thereby determining the normal condition of the armature 16. I employ a second spring 30, preferably weaker than the spring 26, for the purpose of reinforcing gravity to insure the release of the armature when the magnetic pull is not sufficient to hold it in its normal position.

The operation of the device will now be clear. When no current traverses the coils 19 and 20, the armature 16 will drop, due to the combined action of gravity and of the spring 30. The arm 22 will then be in its uppermost position, as will the arm 23. The arm 23 is thereby brought into engagement with the collar 31, thereby raising the tripping-arm 15 and placing the catch 13 in such a position that it will not engage the projection 14. When the catch is in this position, the switch obviously cannot be locked in a closed position, as the catch will not engage the same, the spring 32 throwing the switch open when released.

The coil 19 in series with the mains is composed of but few turns of wire or bar, which are alone insufficient to raise the armature to effect the engagement of the catch with the projection 14 on the breaker or switch, so that even if the breaker or switch be closed and current threads the said coil the catch 13 will not hold it in place. The coil 20 has a sufficient number of turns so that the ampere-turns thereof create a field strong enough to bring the armature to its normal position, as indicated in the drawings. When the armature assumes this position, which it does when conditions are normal, the arms 23 and 22 are lowered out of engagement with the collar 31 upon the arm 15, thus releasing the catch 13 and permitting it to engage the projection 14 when the breaker is normally closed. The arm 15 now rests upon the armature, but is not raised sufficiently to trip the catch 13. The arm 15 is in the form of a plunger extending through the core of the magnet. Another important feature of this construction is now apparent in that the booster-circuit cannot be closed unless the motor-circuit is already closed, so that there is no danger that the generator 4 will operate as a motor. A sudden overload will cause the armature to be attracted suddenly, due to the increased magnetism created by the coil 19, thus raising the arm 15 and releasing the catch 13. A magnetic circuit of comparatively low reluctance is provided by the use of the angular piece 18, and the ampere-turns required to energize the armature are thereby greatly reduced.

An underload or break in the motor-circuit will release the armature, which, reinforced by the spring 30, raises arms 22 and 23, thereby tripping the catch 13 and opening the circuit. The resistance offered by the armature to the attractive power of the coils depends, of course, upon the tension of the spring 26, which may be adjusted for the amount of overload upon which the breaker is to open the circuit.

Switches 6 and 7 are provided for opening the respective circuits protected by either of the circuit-breakers 5 and 8 when either of the breakers has operated to open either circuit.

I have shown a speed-controlling device 34 in series with the field of the motor 3, which speed-controlling device is used for weakening or strengthening the field of such motor to increase or decrease its speed, thereby to cause a more effective regulation of the system.

I have herein shown and particularly described the preferred embodiment of my invention; but I do not wish to be limited to the precise arrangement shown, as my invention is susceptible of many modifications.

Having thus described my invention, I claim as new and desire to secure by Letters Patent—

1. In a circuit-breaker, the combination with the switch member thereof, of an electromagnet having suitable circuit connections for increasing its effective energization upon overload and permitting of effective deenergization upon underload, a single armature for the electromagnet normally held in an intermediate position, and a single means for holding the switch in a closed position, the said armature being adapted when further attracted by the electromagnet upon overload to operate said means to release the switch, and being further adapted when released by the electromagnet upon underload also to operate said means to release the switch, substantially as described.

2. In a circuit-breaker, the combination with a switch, of a detent for normally securing the same in a closed position, an electromagnet, an armature therefor, and mechanism interposed between the armature and detent, normally permitting the detent to retain the switch in a closed position, said mechanism being adapted to be operated by the armature when further attracted by the electromagnet upon the occurrence of an overload to operate the detent and release the switch, and being adapted also to be operated by the armature when released upon the occurrence of underload to operate the detent and release the switch, substantially as described.

3. In a circuit-breaker, the combination with a switch, of a detent for normally securing the same in a closed position, an electromagnet, an armature therefor which is pivotally mounted between its ends, an adjusting-spring acting upon the armature on one side of a pivot and coöperating with the electromagnet when normally energized for holding the armature in an intermediate position, the said electromagnet acting upon the armature on the other side of its pivot, and mechanism intervening between the armature and detent, said mechanism being operated by the armature when further attracted by the electromagnet in opposition to said spring to operate the detent and release the switch, said mechanism being also operated when the armature is released by the electromagnet to operate the detent and release the switch, substantially as described.

4. In a circuit-breaker, the combination with a switch, of a detent for normally securing the same in a closed position, an electromagnet, an armature therefor which is pivotally mounted between its ends, an adjusting-spring acting upon the armature on one side of its pivot and coöperating with the electromagnet when normally energized for holding the armature in an intermediate position, the said electromagnet acting upon the armature on the other side of its pivot, mechanism intervening between the armature and detent, said mechanism being operated by the armature when further attracted by the electromagnet in opposition to said spring to operate the detent and release the switch, said mechanism being also operated when the armature is released by the electromagnet to operate the detent and release the switch, and a second spring located upon the same side of the armature-pivot with the aforesaid spring for insuring the positive withdrawal of the armature when released by the electromagnet, substantially as described.

5. In a circuit-breaker, the combination with a switch, of a detent for normally securing the same in a closed position, an electromagnet, an armature therefor, an adjusting-spring coöperating with the electromagnet when normally energized for holding the armature in an intermediate position, and mechanism intervening between the armature and detent, said mechanism being operated by the armature when further attracted by the electromagnet in opposition to said spring to operate the detent and release the switch, said mechanism being also operated when the armature is released by the electromagnet to operate the detent and release the switch, substantially as described.

6. In a circuit-breaker, the combination with a switch, of a detent for normally securing the same in a closed position, an electromagnet, an armature therefor, an adjusting-spring coöperating with the electromagnet when normally energized for holding the armature in an intermediate position, mechanism intervening between the armature and detent, said mechanism, being operated by the armature when further attracted by the electromagnet in opposition to said spring to operate the detent and release the switch, said mechanism being also operated when the armature is released by the electromagnet to operate the detent and release the switch, and a second spring for insuring the positive withdrawal of the armature when released by the electromagnet, substantially as described.

7. In a circuit-breaker, the combination with a switch, of a detent for normally securing the same in a closed position, an electromagnet, an armature therefor, an adjusting-spring coöperating with the electromagnet when normally energized for holding the armature in an intermediate position, mechanism intervening between the armature and detent, said mechanism being operated by the armature when further attracted by the electromagnet in opposition to said spring to operate the detent and release the switch, said mechanism being also operated when the armature is released by the electromagnet to operate the detent and release the switch, and a second spring, located upon the same side of the armature-pivot with the aforesaid spring for insuring the positive withdrawal of the armature when released by the electromagnet, substantially as described.

8. In a circuit-breaker, the combination with the switch member thereof, of a detent for normally securing the same in a closed position, an electromagnet provided with a fixed magnetic core, an armature, a fixed magnetic portion 18 for completing the magnetic circuit between one end of said core and the armature, said armature being adapted to move axially of said magnet, and means whereby a movement in either direction of said armature from its normal position is adapted to effect the release of the detent from the switch, substantially as described.

9. In a circuit-breaker, the combination with the switch member thereof, of a detent for normally securing the switch in a closed position, an electromagnet, a pivoted armature therefor, an arm 15 intervening between the armature and detent and adapted for engagement with the armature upon one side of its pivot, mechanism intervening between said arm and a portion of the armature upon the other side of its pivot, and a spring coöperating with the electromagnet when normally energized to hold the armature in an intermediate position, the said armature when drawn farther toward the magnet serving to engage the said arm to operate the detent and release the switch, and when released by the magnet serving through the agency of the said intervening mechanism also to operate the detent and release the switch, substantially as described.

10. In a circuit-breaker, the combination with the switch member thereof, of a detent for normally securing the switch in a closed position, an electromagnet, a pivoted armature therefor, an arm 15 intervening between the armature and detent and adapted for engagement with the armature upon one side of the pivot, mechanism intervening between said arm and the portion of the armature upon the other side of its pivot, said mechanism comprising a swinging arm 23 having engagement with the arm 15 and a second arm 22 linked to the arm 23 and the armature, and a spring coöperating with the electromagnet when normally energized to hold the armature in an intermediate position, the said armature when drawn farther toward the magnet serving to engage the said arm to operate the detent and release the switch, and when released by the magnet serving through the agency of the said intervening mechanism also to operate the detent and release the switch, substantially as described.

11. In a circuit-breaker, the combination with the switch member thereof, of a detent for normally securing the switch in a closed position, an electromagnet, a pivoted armature therefor, an arm 15 intervening between the armature and detent and adapted for engagement with the armature upon one side of its pivot, mechanism intervening between said arm and the portion of the armature upon the other side of its pivot, said mechanism comprising a swinging arm 23 having engagement with the arm 15 and the second arm 22 linked to the arm 23 and the armature, a spring coöperating with the electromagnet when normally energized to hold the armature in an intermediate position, the said armature when drawn farther toward the magnet, serving to engage the said arm to operate the detent and release the switch, and when released by the magnet serving through the agency of the said intervening mechanism also to operate the detent and release the switch, and an adjusting-spring coöperating with the magnet when normally energized to hold the armature in an intermediate position, substantially as described.

12. In a system of electrical distribution, the combination with a circuit, of a switch for controlling the continuity thereof, a detent for normally securing the switch in a closed position, an electromagnet connected in the circuit, an armature for the electromagnet, for operating the detent to effect the release of the switch, an adjusting-spring coöperating with the electromagnet to hold the armature in a normal position, the said spring serving to determine the degree of energization in the magnet necessary for the operation of the armature, the said spring having separable engagement with the armature, and means permitting the armature when released to be disengaged from the spring, said armature when released also serving to operate the detent to release the switch, substantially as described.

13. In a system of electrical distribution, the combination with a circuit, of a switch for controlling the continuity thereof, a detent for normally securing the switch in a closed position, an electromagnet connected in the circuit, an armature for the electromagnet, for operating the detent to effect the release of the switch, an adjusting-spring coöperating with the electromagnet to hold the armature in a normal position, the said spring serving to determine the degree of energization in the magnet necessary for the operation of the armature, the said spring having separable engagement with the armature, and means permitting the armature when released to be disengaged from the spring, said armature when released also serving to operate the detent to release the switch, and an additional spring for insuring the withdrawal of the armature from the magnet when released, substantially as described.

In witness whereof I hereunto subscribe my name this 28th day of October, A. D. 1899.

CLARENCE H. NORWOOD.

Witnesses:
 GEORGE L. CRAGG,
 MAX ZABEL.